May 15, 1962 P. CRAMPTON ET AL Re. 25,168

AUTOMATIC TRAILER HITCHES

Original Filed Sept. 2, 1958 4 Sheets-Sheet 1

Inventors
P. Crampton
E. Crowe
By Glascock Downing & Seebold
Attys

AUTOMATIC TRAILER HITCHES

Original Filed Sept. 2, 1958 4 Sheets-Sheet 2

Inventors
P. Crampton
E. Crowe
By Glasock Downing & Seebold
Attys.

AUTOMATIC TRAILER HITCHES

Original Filed Sept. 2, 1958 4 Sheets-Sheet 3

Inventors
P. Crampton
E. Crowe
By Glascock Downing & Seebold
Attys.

Inventors
P. Crampton
E. Crowe
By Howard Downing Fabble
Attys

United States Patent Office

Re. 25,168
Reissued May 15, 1962

25,168

AUTOMATIC TRAILER HITCHES

Peter Crampton, Dagenham, and Edgar Crowe, Romford, England, assignors to Ford Motor Company Limited, London, England Original No. 2,926,931, dated Mar. 1, 1960, Ser. No. 758,450, Sept. 2, 1958. Application for reissue Oct. 27, 1961, Ser. No. 149,151
Claims priority, application Great Britain Sept. 2, 1957
6 Claims. (Cl. 280—479)

Matter enclosed in heavy brackets [ ] appears in the original patent but forms no part of this reissue specification; matter printed in italics indicates the additions made by reissue.

This invention relates to automatic trailer hitches for the quick attachment of farm trailers and like equipment to tractors.

Methods of providing quick attachment of trailers and the like to tractors are known but it is often the case that presence of the hitch mechanism interferes with the use of the tractor on other operations not requiring the use of the hitch which necessitates disconnection and/or removal of certain parts with the usual disadvantages associated with such a procedure.

An object of this invention is to provide an automatic trailer hitch that may remain fitted to the tractor while the tractor is engaged on other types of work such as using mounted implements and operating power driven and belt pulley driven implements from the power-take-off.

A further object of this invention is to provide a hitch which, once it is fitted, requires no subsequent additional fitting in order to enable the tractor to be adapted from working with mounted implements to towing trailers or vice versa.

According to the invention there is provided in a tractor having a hydraulic lift system and lift arms operated by said lift system; a towing hook, auxiliary lift means pivotally connected to said tractor to raise and lower the towing hook, slotted links connecting said auxiliary lift means with said lift arms, and latch means operable to automatically mechanically lock said auxiliary lift means in a raised position and manually releasable, whereby when said towing hook is in raised position the slotted links permit use of said lift arms while said towing hook remains in raised position.

The invention will be described in an embodiment with reference to FIGURES 1 to 4 of the accompanying drawings, wherein.

Figure 1:
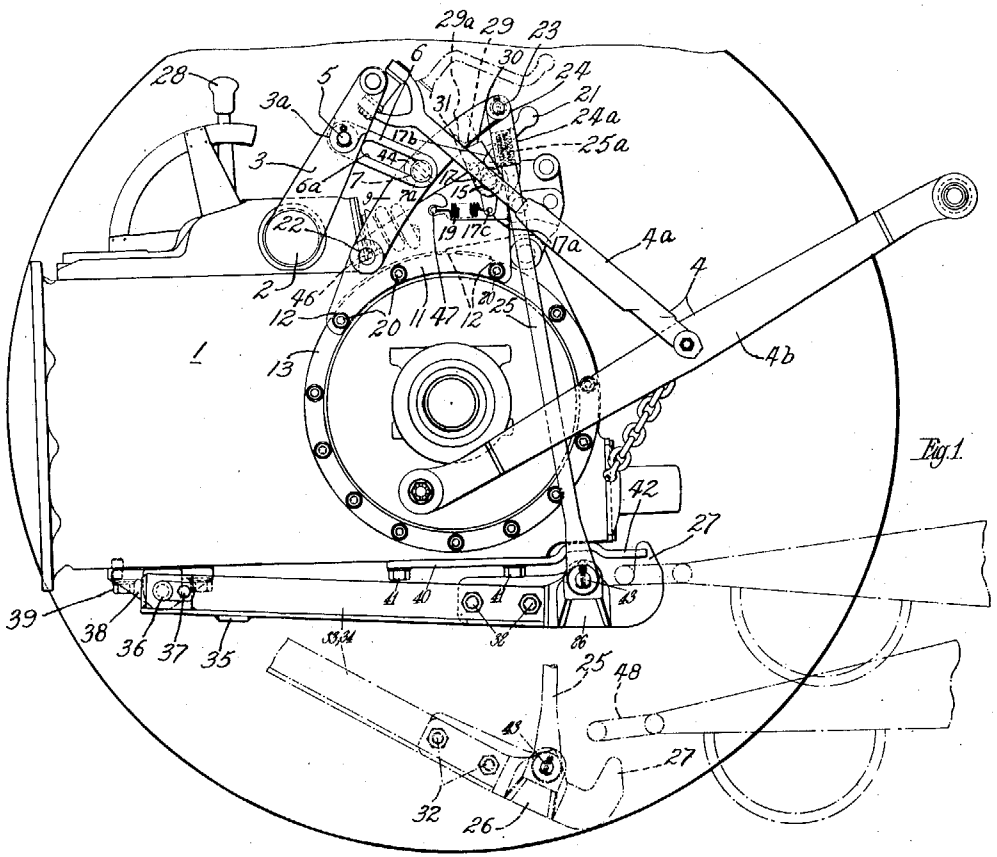
FIGURE 1 is a side elevation of the rear portion of a tractor showing the hitch in raised position, with in phantom, a trailer drawbar in the towing position and also in phantom the hook member in lowered position with a trailer drawbar in position for raising to its tow-in position.
Figure 2:
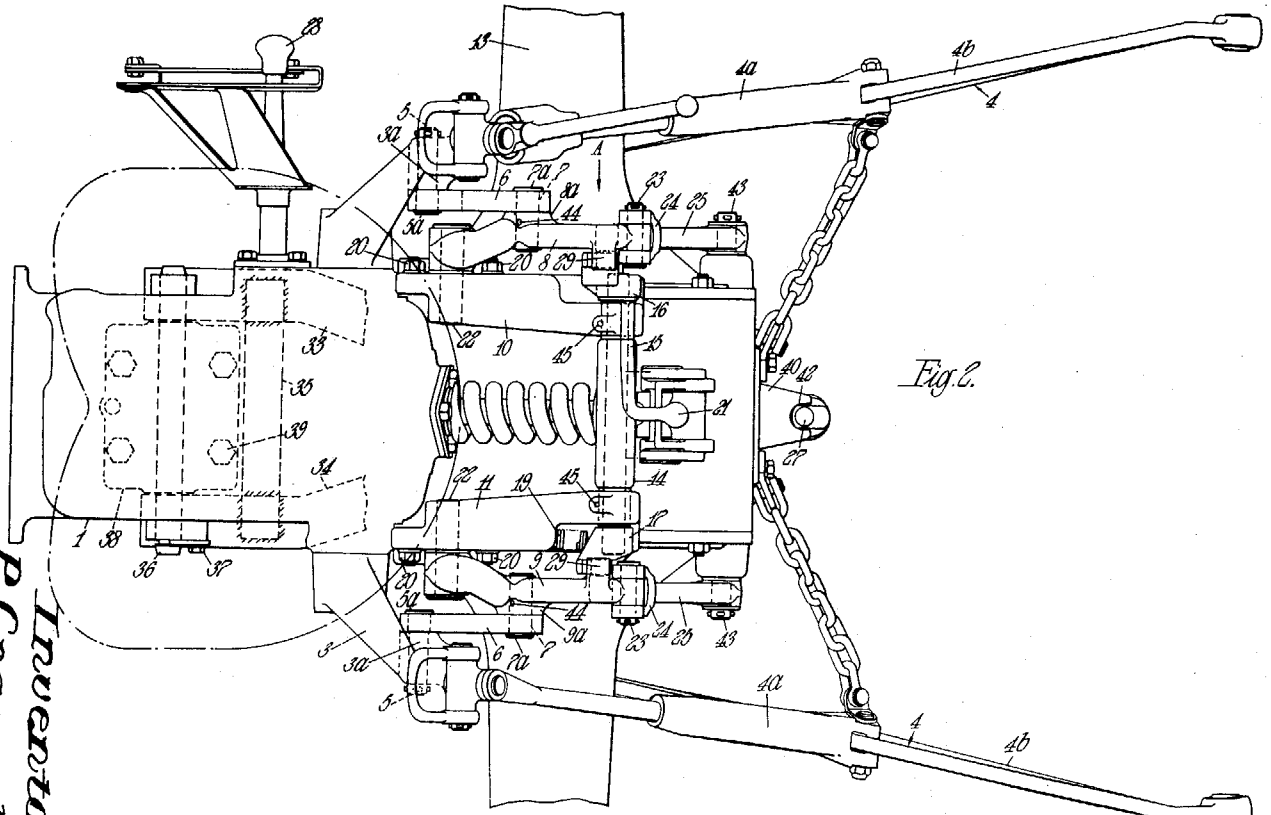
FIGURE 2 is a plan view of the corresponding portion of the tractor.
Figure 3:
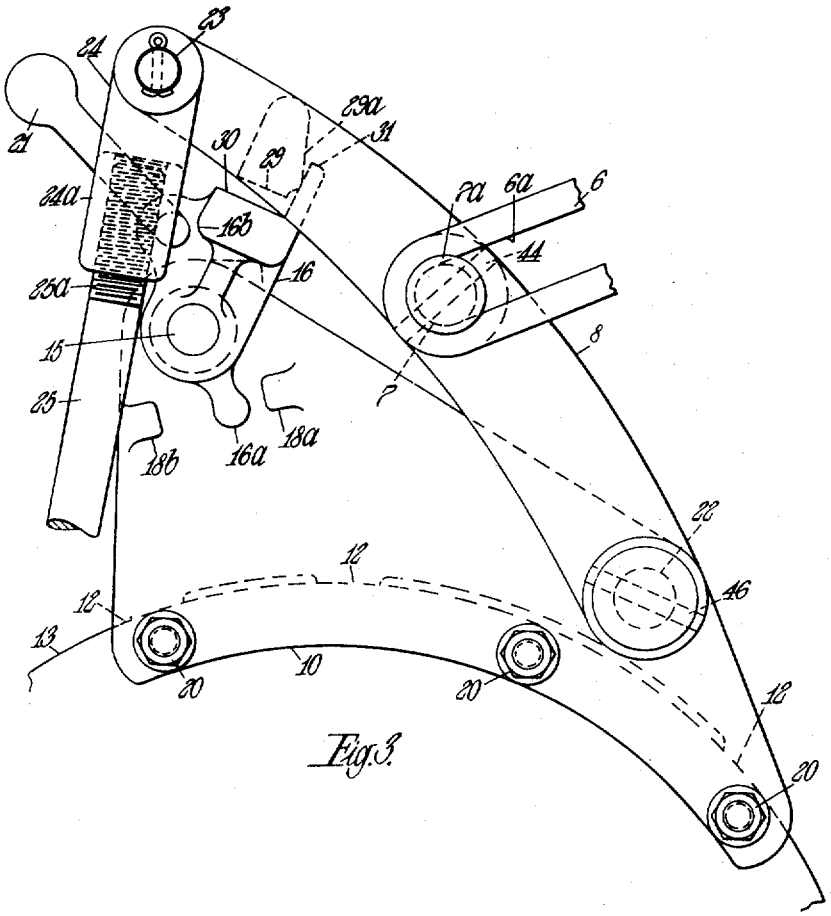
FIGURE 3 is a detail of an enlarged scale seen in the direction of the arrow A in FIGURE 2.

Referring to the drawings, and in particular to FIGURES 1 to 3, there is shown a pair of lift arms 3 arranged to be raised and lowered by the rotation of cross shaft 2, said cross shaft being rotated by a hydraulic mechanism (not shown) fitted into tractor 1 and controlled by a hydraulic control lever 28.

An implement attachment linkage arrangement 4, comprising links 4a pivotally attached to lift arms 3 and pivotally attached to draft links 4b which are in turn pivotally attached to the tractor 1, is raised and lowered when the lift arms 3 are raised or lowered.

Links 6 pivotally attached to lift arms 3 by pins 5 each have a slot 6a in which a pin 7 is free to slide. The links 6 are prevented from moving laterally at their pivot ends by pin heads 5a and bosses 3a on lift arms 3; and at their slotted end by pin heads 7a and bosses 8a and 9a on arms 8 and 9 respectively.

Pins 7 are rigidly fixed to arms 8 and 9 by pins 44 (see FIGURE 3).

Support members 10 and 11 are rigidly fixed to each side of tractor 1 by studs and nuts 20 and are located on rear axle housing 13 by projections 12.

The support members 10 and 11 are interconnected by a tube 14 rigidly fixed by pins 45 to support members 10 and 11 thus providing a rigid support assembly. This tube also serves as a bearing for a shaft 15.

Rigidly fixed to each end of the shaft 15 and in alignment with each other are props 16 and 17 (see FIGURE 3 in particular), shaft 15 being free to rotate in tube 14.

The right hand prop 16 has a projection 16a that engages with limiting stops 18a and 18b on the right hand support 10 thus limiting the amount of rotation of shaft 15 and hence the movement of both props 16 and 17.

Rigidly fixed to right hand prop 16 is a release handle 21.

The left hand prop 17 has a lug 17a with a hole 17c. A tension spring 19 located in hole 17c is anchored to a hole 47 in left hand support 11.

When the handle 21 is moved so as to extend the tension spring 19 both props move simultaneously and the stop 18b prevents overstraining of the tension spring 19 while the stop 18a ensures that the tension spring 19 is always under tension when the props 16 and 17 are in their most rearward position.

The arms 8 and 9 are pivotally attached to support members 10 and 11 respectively by pins 22 rigidly fixed by pins 46 to support members 10 and 11. It will be appreciated that the arms 8 and 9 could, where convenient, be pivoted about the same axis as the lift arms 3.

The arms 8 and 9 each have a projection 29 so arranged as to engage with a location 30 acting as a locating surface on each of props 16 and 17. A projection 31 on each of props 16 and 17 provides a suitable stop means engageable with projection face 29a on arms 8 and 9 enabling the props 16 and 17 to provide good engagement of projections 29 on locations 30.

When the lift arms 3 are raised by placing hydraulic control lever 28 in raise position, by virtue of the connections between lift arms 3 and the arms 8 and 9 comprising the links 6, the arms 8 and 9 are also raised. On the raising of arms 8 and 9 the projection face 29a engages the lower stop means formed by prop faces 16b and 17b pushing the props 16 and 17 forward against the tension spring 19.

When the arms 8 and 9 are raised higher than the location 30, the props 16 and 17 are urged by the tension spring 19 to return to their original position, in returning to their original position the projections 31 on props 16 and 17 make contact with the projection faces 29a on arms 8 and 9.

In the event of the hydraulic control lever 28 being moved into the "lower" position or any leakage in the hydraulic system, the projections 29 make contact with location 30 on props 16 and 17. Hence the arms 8 and 9 are then mechanically locked in a raised position.

It will be appreciated that the arms 8 and 9 should be raised slightly before operation of release handle 21 to disengage prop locations 30 from projections 29.

Pivotally attached to arms 8 and 9 by pins 23 are yokes 24 provided with female screwed necks 24a; and rods 25 have a male screwed portion 25a engageable with yokes 24 and thus forming adjustable lift rods.

The towing member forms an arrangement similar to that described in British patent specification No. 764,787, namely, in operation the main towing hook member 26 is rigidly fixed by means of bolts 32 to two lower links 33 and 34 which extend forwardly under the belly of the tractor and are pivoted on pin 36 mounted ahead of the tractor rear axle, which is held relative to lower links 33 and 34 by a retaining bolt 37.

This pin 36 passes through bracket 38 which is rigidly attached by bolts 39 to the underside of tractor 1.

The above mentioned lower links 33 and 34 are triangulated in plan view and are tied by cross member 35 so that extreme structural rigidity is ensured.

The main towing hook member 26 embodies pins 43 at its extreme ends to which are pivotally attached the lift rods 25.

Due to the connection between the arms 8 and 9 and towing hook 26 comprising yokes 24 and lift rods 25, the locking of the arms 8 and 9 in the raised position also locks the towing hook member 26 in the raised position; in addition to which, of course, the raising or lowering of arms 8 and 9 raises or lowers the towing hook member 26 and hence any implement drawbar 48 that may be located on towing hook member 26.

It will be appreciated that any load that may be on the props 16 and 17 due to load on hook member 26 must be removed by raising lift arms 3 by hydraulic power before the release handle 21 and hence the locking mechanism comprising props 16 and 17 can be released.

A plate 40 rigidly fixed to underside of tractor 1 by bolts 41 has a slot 42. This slot 42 engages the hook 27 when the towing hook member 26 is in the raised position and thus takes the side loads which can be imposed upon the towing hook 27.

Further, the towing hook member 26 in the fully raised position comes to rest in the raised position so that the lower face of plate 40 prevents the implement drawbar 48 from jumping out of engagement with the towing hook 27.

Figure 4:
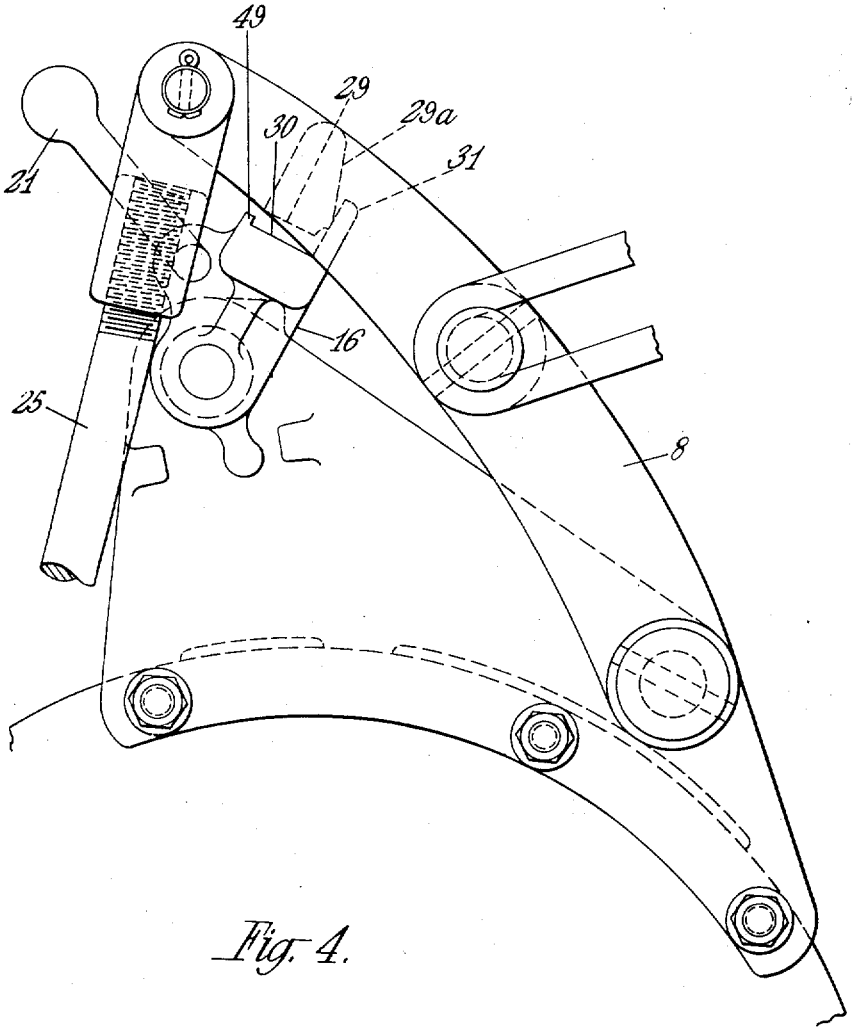
FIGURE 4 shows a modification of FIGURE 3.

FIGURE 4 shows, in a view similar to FIGURE 3 a modification of the structure whereby an additional projection 49 is provided on each of props 16 and 17. Thus when the arms 8 and 9 are resting on props 16 and 17, projection 49 prevents the accidental disengagement of projection 29 from the props, as might occur if release handle 21 were operated before the arms 8 and 9 are raised by the hydraulic lift arrangements.

It will be appreciated from the above description that various modifications to the basic design can be contemplated within the scope of the invention.

We claim:

1. In a tractor having a hydraulic lift system and lift arms operated by said lift system; a towing hook, auxiliary lift means pivotally connected to said tractor to raise and lower the towing hook, slotted links connecting said auxiliary lift means with said lift arms, and latch means operable to automatically mechanically lock said auxiliary lift means in a raised position and manually releasable, whereby when said towing hook is in raised position the slotted links permit use of said lift arms while said towing hook remains in raised position.

2. The structure defined by claim 1 which is further characterised in that the auxiliary lift means comprises a pair of auxiliary lift arms pivotally connected to said tractor and connected with said lift arms by means of said slotted links, and a pair of adjustable links connecting the auxiliary lift arms and the towing hook.

3. The structure defined by claim 2 which is further characterised in that the latch means comprises a pair of spring urged rockable members each having upstanding stop means, a locating surface and a lower stop means below said locating surface and laterally spaced from said upstanding stop means, and a projection on each of said auxiliary lift arms; each of said projections having a portion selectively engageable with either of said stop means on one of said rockable members and a locating face engageable with said locating surface on said one rockable member, whereby during raising of said auxiliary lift arms said rockable members engage said portions of said projections, first by said lower stop means and latterly by said upstanding stop means, said locating surface and said locating face being thereby brought into opposition to lock the auxiliary lift arms after a slight lowering thereof.

4. The structure defined by claim 3 which is further characterised in that a projection is provided on the locating surface of said rockable members to prevent accidental disengagement from the locating face.

*5. In a tractor having a hydraulic lift system and lift arms operated by said lift system; a towing hook, auxiliary lift means pivotally connected to said tractor, rigid links connecting the auxiliary lift means and the towing hook so that pivoted movement of the auxiliary lift means raises or lowers the towing hook, slotted links connecting said auxiliary lift means with said lift arms, and latch means operable to automatically mechanically lock said auxiliary lift means and towing hook in a raised position and manually releasable, whereby when said towing hook is in raised position the slotted links permit use of said lift arms while said towing hook remains in raised position.*

*6. The structure defined by claim 5 which is further characterized in that the auxiliary lift means comprises a pair of auxiliary lift arms pivotally connected to said tractor and connected with said lift arms over said slotted links, said rigid links being longitudinally adjustable.*

References Cited in the file of this patent or the original patent

UNITED STATES PATENTS

| | | |
|---|---|---|
| 2,786,695 | Wilson | Mar. 26, 1957 |
| 2,791,444 | McNeice | May 7, 1957 |
| 2,826,433 | Poole | Mar. 11, 1958 |